United States Patent [19]

Zieve et al.

[11] 3,810,119

[45] May 7, 1974

[54] PROCESSOR SYNCHRONIZATION SCHEME

[75] Inventors: Robert M. Zieve, Trumbull, Conn.; Christopher L. Maginnis, Turnersville; Moishe Kleidermacher, Runnemede, both of N.J.

[73] Assignee: The United States of America as represented by the Secretary of the Navy, Washington, D.C.

[22] Filed: May 4, 1971

[21] Appl. No.: 140,178

[52] U.S. Cl... 340/172.5, 235/153 AC, 235/153 AE

[51] Int. Cl. ... G05b 11/18, G05b 19/28, G06f 9/18

[58] Field of Search.................. 340/172.5; 235/153

[56] References Cited

UNITED STATES PATENTS

| | | | |
|---|---|---|---|
| 3,444,528 | 5/1969 | Lovell et al. | 340/172.5 |
| 3,517,174 | 6/1970 | Ossfeldt | 285/153 |
| 3,409,877 | 11/1968 | Alterman et al. | 340/172.5 |
| 3,377,623 | 4/1968 | Reut et al. | 340/172.5 |
| 3,395,396 | 7/1968 | Pasternak | 340/172.5 |
| 3,562,716 | 2/1971 | Fontaine et al. | 340/172.5 |
| 3,582,896 | 6/1971 | Silber | 340/172.5 |
| 3,593,307 | 7/1971 | Gouge et al. | 340/172.5 |
| 3,602,900 | 8/1971 | DeLaige et al. | 340/172.5 |
| 3,566,368 | 2/1971 | DeBlaum | 340/172.5 |
| 3,651,482 | 3/1972 | Benson et al. | 340/172.5 |
| 3,623,014 | 11/1971 | Doelz et al. | 340/172.5 |
| 3,471,686 | 10/1969 | Connell | 235/153 AE |
| 3,636,331 | 1/1972 | Amrehn | 235/151.12 |
| 3,303,474 | 2/1967 | Moore | 340/172.5 |
| 3,678,467 | 7/1972 | Nussbaum et al. | 340/172.5 |
| 3,624,372 | 11/1971 | Philip et al. | 340/146.1 BE |
| 3,185,963 | 5/1965 | Peterson et al. | 340/168 |
| 3,257,546 | 6/1966 | McGovern | 235/153 AC |

*Primary Examiner*—Gareth D. Shaw
*Assistant Examiner*—Jan E. Rhoads
*Attorney, Agent, or Firm*—R. S. Sciascia; P. Schneider

[57] ABSTRACT

A method of maintaining synchronization between two independently clocked, stored-program computer processors which are executing the same program simultaneously and are connected in a master-slave relationship. There is further provided a method of preventing a failure from disabling both master and slave units. A special function is inserted at selected intervals which delays the master processor until the slave processor catches up. Further, means are provided to automatically detect when a failure occurs. This program alignment and error detection are accomplished by inserting checkpoints at selected intervals at which the redundantly processed results are compared.

10 Claims, 5 Drawing Figures

INVENTORS
ROBERT M. ZIEVE
CHRISTOPHER L. MAGINNISS
MOISHE KLEIDERMACHER
BY Thomas O. Watson Jr.
ATTORNEY

PROCESSOR SYNCHRONIZATION SCHEME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A. Field of the Invention

The present invention relates generally to a process for interconnection of computers for the purpose of insuring maximum reliability of computer operations and more particularly to a method of maintaining synchronizations between two independently clocked, stored-program computer processors which are executing the same program simultaneously.

B. Description of the Prior Art

In certain computer controlled, real-time systems, uninterrupted continuity of system operation is mandatory. One example of such a system is a computer system which controls the flight of a missile. Another example is a computer controlled telephone central office. It would be unacceptacle to permit a complete loss of telephone service upon the malfunction of the controlled computer system.

In order to maintain computer system operation, redundant computer processors are provided. In the event of a failure of the on-line computer processor, the redundant unit immediately assumes control of the system. To do this, the redundant unit must be provided with up-to-date information concerning the current status of the system. In the example of the telephone exchange, the status information would include connections already established, progress of calls in dialing and certain other forms of operational information.

One method of providing the redundant unit with correct status information is to have it simultaneously execute the same program as the on-line processor. In this way, the redundant unit's memory is continuously updated to current data. If two computer processors simultaneously execute the same program, external controls must be applied to synchronize them. This will require some interconnection between the computer processors; but these interconnections must be minimized to avoid the possibility of one malfuntion disabling both processors.

SUMMARY OF THE INVENTION

The invention provides a method of maintaining synchronization between two independently clocked, stored-program computer processors which are executing the same program simultaneously. In order to prevent the two processors from drifting too far apart in executing their computer programs, a special function is inserted at selected intervals to delay the lead processor until the other catches up. Means are additionally provided to automatically detect when a failure occurs in one of the units. This program alignment and error detection are accomplished by inserting checkpoints at selected intervals at which the redundantly processed computer results are compared.

OBJECTS OF THE INVENTION

An object of the present invention is the provision of means to insure the maximum reliability in computer operations.

Another object of the present invention is to provide a method of maintaining synchronization between two independently clocked, stored-program computer processors which are executing the same program simultaneously.

A further object of the invention is the provision of means to delay the lead processor of a redundant computer system until the trailing processor catches up.

Still another object of the invention is the provision of means to automatically detect when a failure occurs in one of the computer processors.

Other objects, advantages and novel features of the present invention will become apparent from the following detailed description of the invention when considered in conjunction with the accompanying drawings.

DESCRIPTION OF THE PREFERRED EMBODIMENT

Figure 1:
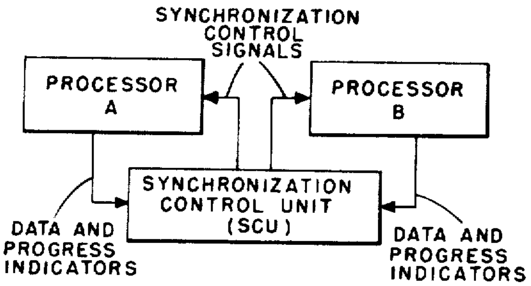
FIG. 1 is an illustration in block diagram form of a preferred embodiment of the synchronization control system of the instant invention.

Two computer processors operating from independent cloks, but executing the same program, will gradually drift apart. It is therefore necessary, at selected intervals, to insert a special function which delays the lead computer processor until the redundant processor catches up. Furthermore, if the redundant processor is to assume control when the on-line unit fails, means are required to automatically detect when a failure occurs.

A method of accomplishing both program alignment and error detection is to insert checkpoints at selected intervals, at which redundantly processed results are compared. Such a method could be implemented on the General Automation processor SPC–16/ or any other processor in that series of processors. These matchpoints (MAT) are designed such that a processor reaching a MAT will not proceed to the next instruction until the other processor reaches the MAT. When both processors reach a MAT, certain data comparisons are made. If the two computer processors have independently produced the same results, it may reasonably be assumed that both are functioning error free. If the two computer processors produce different results, an error has been detected.

While executing their operating programs, the processors of the instant invention are subject to two types of hardware interrupt cycles. A MEMORY INTERRUPT occurs every 1.1 milliseconds as determined by a counter. When this occurs, the execution of program instructions is temporary halted and a hardware cycle called MEMORY INTERRUPT CYCLE (MIC) is entered. In a MIC, the contents of, for example, seven specific memory words are incremented by 1. These memory words are used as elapsed-time-counters. At the conclusion of the MIC, instruction execution resumes with the next instruction.

A PROGRAM INTERRUPT occurs at predetermined points in the program. A PROGRAM INTERRUPT occurs during the next instruction following a MIC cycle if the first elapsed-time counter, referred to above, reached zero. A PROGRAM INTERRUPT causes the sequential execution of instructions to be stopped and a hardware cycle, PROGRAM INTERRUPT CYCLE (PIC), to be entered. At the inception of the PIC, the current setting of the program counter and various other key indicators are stored. The program counter is then reset to the location of a special interrupt program. The interrupt program is then executed. When it is completed, the program counter is reset to the value previously restored during the PIC; and normal program sequence execution is resumed. Since the MIC occurrence is determined by a hardware counter, it is asynchronous with respect to program execution. That is, a MIC may occur between any two instructions. Since the PIC is initiated by the MIC, the PIC is likewise asynchronous with respect to the program. However, during the execution of the main program, decisions are made on the basis of the contents of the elapsed-time counters and various memory words which are changed during MEMORY and PROGRAM INTERRUPTS. The results of the decisions are therefore dependent upon the exact point in the program at which the MIC or PIC occurs.

In the computer system of the instant invention, two computer processors are operated in synchronism. However, they may differ by a few instructions due to their independent clocks. If they are to make the same decisions at branch points in the program, it is essential that the MIC and PIC occur at precisely the same point in the program instructions in both computer progessors. However, since the interrupts are asynchronous with respect to the program, some artificial means must be provided to control them. The method of the instant invention is to maintain a count of the number of instructions performed by each computer processor. When an interrupt occurs, the on-line processor is permitted to execute it. The off-line processor, however, is not permitted to execute the interrupt until the instruction counters indicate that the same point in the program has been reached.

As explained previously, interrupt synchronization requires that both processors enter interrupts from the same program point. However, the implementation of the synchronization requires that one processor be used as a standard against which the other is controlled. A master-slave relationship is establised, with the on-line unit designated the master and the off-line processor designated the slave. For control purposes, the processors are arranged so that the master unit performs its instructions and interrupt functions first. The slave unit is always slightly behind the master unit, but only a few instructions maximum and an average of only a fraction of an instruction.

It would be noted that the system is completely bidirectional; that is, when both computer processors are operating, either one may be the master and the other the slave unit. The decision may be made by a master-slave selector switch which may be located on the system control panel.

FIG. 1 illustrates a preferred embodiment in block diagram form of the total control system. A Synchronization Control Unit (SCU) receives inputs from the master and the slave processors and returns control signals to each to maintain the appropriate synchronization.

The matchpoint function is implemented by special instruction designated MAT. When a processor reaches a MAT instruction, it sends a signal to the SCU called READY-TO-SYNCHRONIZE (RTS). The processor also supplies the data to be compared for error detection. When both processors have reached the MAT, the SCU sends a signal to the processors indicating that the compared data is the same (GO) or different (NO GO).

The operation of the MAT instruction permits a three-way branch. If a GO is received, the program counter is advanced by 2. This permits the processor to continue the normal program. If a NO GO is received, the program counter is advanced by 1. This causes a jump to a diagnostic program, since a error has been indicated. If neither a GO or a NO GO is received, the program counter, is not advanced at all. This causes the MAT instruction to be repeated. This condition occurs when one processor reaches a MAT before the other processor has reached it. By repeating the MAT instruction, the lead processor maintained in a stalled condition until the trailing processor catches up.

Figures 2, 3:
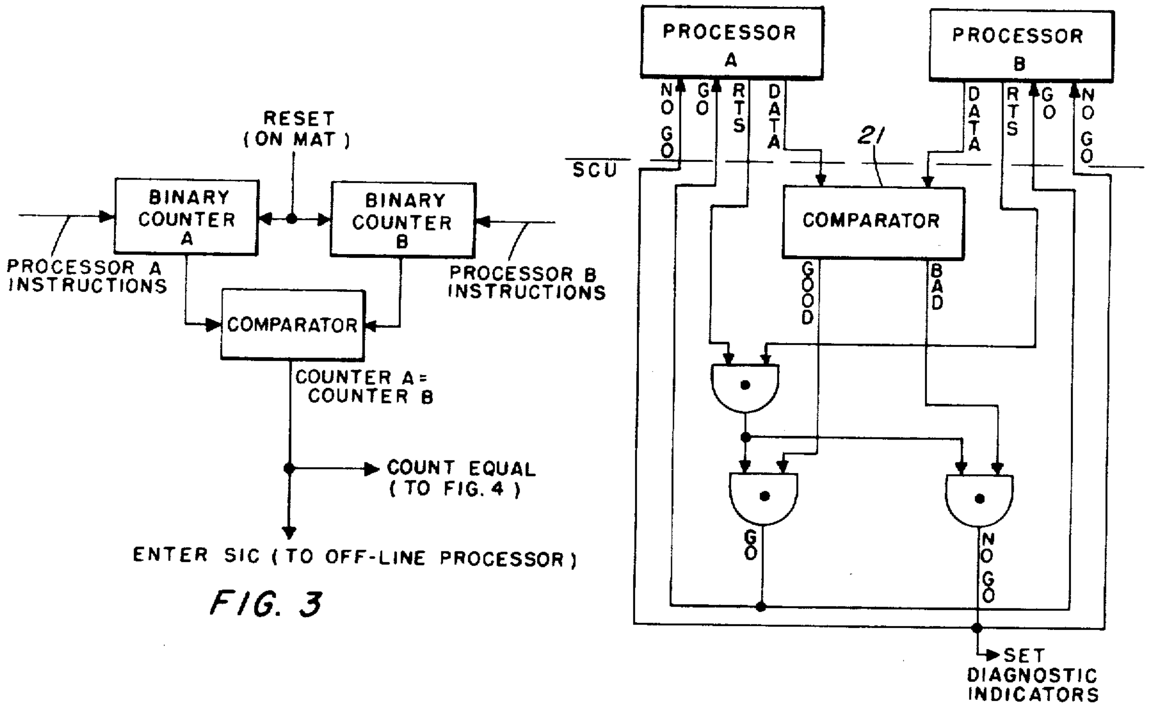
FIG. 2 is an illustration in block diagram form of a preferred embodiment of the matchpoint instruction signaling control unit of the instant invention.
FIG. 3 is an illustration in block diagram form of a preferred embodiment of the program instruction countercomparator of the instant invention.

FIG. 2 is an illustration in block diagram form of a preferred embodiment of the MAT instruction signaling between the processors and the SCU. If both RTS signals are present and the comparator 21 indicates matched data, then a GO signal is generated. If both RTS signals are present and the comparator indicates a mismatch, then a NO GO signal is generated; and diagnostic indicators are set. The diagnostic circuitry is associated with fault assignment rather than maintaining synchronous operation.

Figure 5:
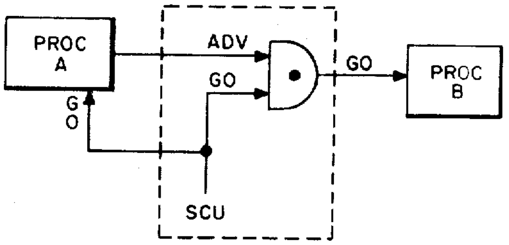
FIG. 5 is an illustration in block diagram form of a modification to FIG. 2 to provide a delay to the off-line processor.

The master-slave relationship requires that the on-line processor exit from the MAT first. Therefore, the GO (or NO GO) must be delayed to the off-line machine. Another signal called ADVANCE (ADV), shown in FIG. 5, is sent from the on-line processor to the SCU when the on-line processor has recognized the GO (or NO GO) and is ready to proceed to the next instruction. The GO (or NO GO) signal is not gated by the SCU to the off-line processor until the ADV signal from the on-line machine is applied to the SCU.

Once a processor has reached a MAT instruction, it is essential that the processor remain there until a GO or NO GO determination by the SCU is made. For this reason, PROGRAM INTERRUPTS are inhibited while a processor is repeating a MAT instruction awaiting for a GO or NO GO signal. If the inhibit were not applied, a situation could arise where a processor entered a MAT, and then exited to the interrupt program just as the second processor entered the MAT. The result would be a GO or NO GO return from the SCU, but an improper response by the on-line processor which had exited to the interrupt program. Without the proper ADV signal, the off-line processor would become lost.

As described previously, interrupt synchronization requires that a count of program instructions performed be kept to insure that the interrupts are entered from the same program point. For this purpose, the SCU contains an instruction counter-comparator as shown in FIG. 3. Each processor sends a pulse to the SCU indicating that a new instruction has been started. This pulse advances the counter for that processor (A or B). A stage-by-stage exclusive-OR comparator verifies whether an equal number of instructions have been started, resulting in a COUNT EQUAL signal. Initialization of the instruction counters is accomplished when a MAT instruction is reached. At that point, the concurrence of the RTS signals verifies that both processors are at the same instruction; and, thus, the instruction counters are reset.

It should be noted that very little equipment is required to implement the logic of the FIG. 3 circuit. The comparator's function is to determine the difference between the number of instructions performed by the two processors, rather than the absolute number performed by each. In a particular system implemented, timing considerations showed that the difference would never exceed three instructions. Therefore, for this particular embodiment, the instruction counters of FIG. 3 required only two binary stages, despite the fact that tens or hundreds of instructions might be executed between resets (MAT's).

Figure 4:
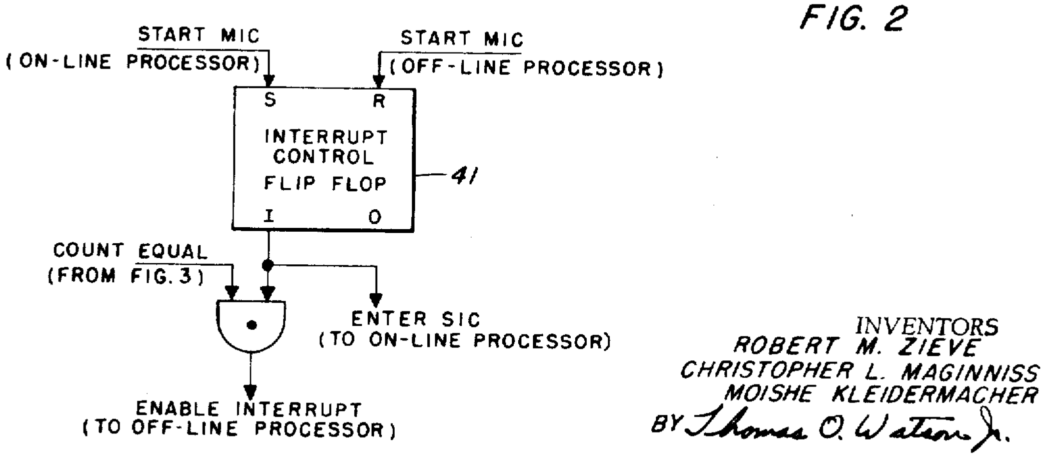
FIG. 4 is an illustration of the redundant processor interrupt synchronization control apparatus of the instant invention.

The essence of interrupt synchronization is that the off-line processor begins the interrupt only after it completes the same instructions that the on-line processor did before it entered the interrupt. For this purpose, the interrupt synchronization control logic of FIG. 4 is required in the SYNCHRONIZATION CONTROL UNIT. The program interrupt control flip-flop 41 is set when the on-line processor begins a MEMORY INTERRUPT CYCLE (MIC). When the instruction counters indicate that the same number of instructions have been completed (COUNT EQUAL), then the ENABLE INTERRUPT signal is sent to the off-line machine. Without this signal, the processor will not execute the interrupt. The enable signal for the on-line machine is always on. When the off-line machine begins the program interrupt, it resets the control flip-flop 41, thereby resetting the logic for the next program interrupt. The logic illustrated in FIG. 4 is used for MEMORY INTERRUPT CYCLES and to control entry into program INTERRUPT CYCLES.

The computer processors contain a further cycle called the SYNCHRONIZATION IMPLEMENTING CYCLE (SIC) that is used to eliminate two problems that remain with the synchronization implementation scheme disclosed so far. One of these problems involves the master-slave relationship that requires the off-line machine to remain slightly behind the on-line processor. If the clocking means of the off-line processor is slightly faster than that of the on-line processor, the former processor may catch up to and even surpass the latter processor. The second problem results from the situation that when the on-line processor executes an interrupt, the off-line processor must wait for the COUNT EQUAL signal. If the on-line processor completely interrupts before the COUNT EQUAL is reached, then the on-line processor will resume instruction execution and advance its instruction counter. This would destroy the COUNT EQUAL reference for the interrupt. The SIC cycle is used as a non-function stalling cycle for synchronization timing. No computations are performed during the SIC cycle. The SIC cycle is entered at the end of an instruction if the SCU sends a signal to the processor called ENTER SIC. The processor cannot begin another instruction until the ENTER SIC signal is removed. The processor can however enter an interrupt cycle (MIC or PIC) if necessary.

The SIC function is used to solve the two problems posed above as follows. If the COUNT EQUAL signal is present (FIG. 3), then the off-line processor has "caught up" and an ENTER SIC signal is sent to the off-line processor to prevent it from executing any further instructions. The off-line processor then enters the SIC cycle and remains there until the on-line processor begins the next instruction, thereby advancing its instruction counter and removing COUNT EQUAL. This in turn removes the ENTER SIC signal to the off-line machine which is now free to execute the next instruction. When the interrupt control flip-flop 41 is set, an ENTER SIC signal is sent to the on-line processor. When this processor completes its interrupt function, it stalls in the SIC cycle rather than continuing with the next instruction. This preserves the instruction count reference at the point from which the interrupt was entered. When the off-line machine reaches this point, COUNT EQUAL will occur, enabling the off-line machine to enter the interrupt. This will reset the interrupt control flip-flop 41, thereby removing the ENTER SIC signal to the on-line processor enabling it to resume instruction execution.

The purpose of the computer system described above is to maintain continuous operation of the system by having a redundant computer processor ready to assume control. However, due to the implementation of synchronization, certain failure modes are capable of crippling both computer processors. For example, the SIC function is used to stall one processor until the other advances to some predetermined point. But in the event of a failure, the expected advance may never come. The on-line processor may be stalled in a SIC cycle endlessly with neither processor operating the system. Similarly, the MAT instruction causes one processor to wait for the other to "catch-up." If the trailing processor never arrives at the MAT, the situation occurs where one processor is defective and the other is stalled in a waiting condition. Finally, the interrupt mechanism requires that the on-line processor enter the interrupt first. Due to a failure, the on-line processor may never execute an interrupt. The processors will not be stopped; but the system will be operating in an incorrect mode since the interrupt functions are not being performed. The off-line processor would perform interrupt functions if it could; but it is prevented from doing so by the lack of an ENABLE INTERRUPT signal from the circuit of FIG. 4.

To prevent the possibility of such a single failure disabling both processors, time-outs are provided in the SCU. Whenever an ENTER SIC signal is sent, a timer is started in the SCU. If the timer expires, a fault alarm is registered. The fault is assigned to the processor that is not in a SIC cycle. For example, if the on-line processor is being held in a SIC cycle waiting for the off-line processor to reach an interrupt and the fault alarm is activated, then the off-line processor is deemed to be operating defectively since it has failed to reach the interrupt. Once the fault is assigned, the alternate processor is put on-line (if it is not already on-line); and all synchronization control signals (for example, ENTER SIC and ENABLE INTERRUPT) are overridden. This permits the working processor to operate the system independently of the faulty redundant processor.

A similar timeout is initiated when one processor signals it has reached a MAT instruction by the RTS signal (FIG. 2). If the second processor does not reach the MAT within a reasonable time, the timer will expire and assign a fault to the processor which has not reached the MAT. The good processor is thus permitted to proceed independently as before since all MAT instructions are designed to produce an automatic instantaneous GO Response once a failure has been registered.

To protect against the failure of the on-line processor to interrupt at all, a timer is employed for each interrupt (MIC and PIC). These interrupts are known to occur at regular intervals; thus, a timer can be set. Furthermore, failure analysis shows that the failure modes of the binary counters of the type that are capable of being used in the instant invention are such that the error will be a double (or more) rate or a total absence. Thus, an extremely accurate timer is not required. If the timer indicates an improper rate (high or low) of either interrupt function, a fault is assigned to that processor; and the alternate processor is put on-line.

Obviously many modification and variations of the present invention are possible in light of the above teachings. It is therefore to be understood that, within the scope of the appended claims, the invention may be practiced otherwise then as specifically described.

We claim:

1. A method of maintaining synchronization between an on-line, stored-program computer-processor and an independently clocked, off-line, stored-program computer-processor which are executing the same program simultaneously comprising the steps of:

inserting at predetermined points in the program MAT instructions;

generating in each processor an RTS signal when a MAT instruction is reached;

timing the period between the generation of an RTS signal by one of said processors and the generation of an RTS signal by the other of said processors;

determining whether this period between RTS signals exceeds a predetermined period;

permitting the processor that generated the first RTS signal to proceed independently through the main program ignoring all MAT instructions of the other processor does not generate an RTS signal within this predetermined period;

determing whether both of said processors have reached the same point in the program by determining whether or not both of the RTS signals are present simultaneously within this predetermined period; and, permitting both of the processors to resume the program only if both RTS signals are present simultaneously.

2. The method of claim 1 further comprising the step of delaying, if the RTS signal from one of the processors is absent, the other processor until both RTS signals are present simultaneously.

3. The method of claim 2 further comprising the steps of:

transferring to a comparator predetermined data from each processor when a MAT instruction is reached;

comparing the data; and, permitting the processors to resume the program only if the data from each processor is the same.

4. The method of claim 3 further comprising the step of switching the processors to an error detection program if the data from each processor is not the same and both RTS signals are present.

5. The method of claim 3 further comprising the step of delaying the off-line processor from resuming the program until after the on-line processor has resumed the program.

6. The method of claim 3 further comprising the steps of:

subjecting the processors to a hardware interrupt cycle, the occurrence of which is asynchronous with respect to program execution;

comparing the number of instructions executed by the processors; and, allowing the off-line processor to enter the interrupt cycle only when it has executed the same number of instructions as the on-line processor.

7. The method of claim 6 wherein the step of comparing the number of instructions executed by the processors includes the steps of:

counting in a first binary counter the number of instructions executed by the on-line processor;

counting in a second binary counter the number of instructions executed by the off-line processor;

comparing the count in the first and second binary counters; and, generating a COUNT EQUAL signal when the counts are the same.

8. The method of claim 7 further comprising the step of resetting the first and second counters to zero when a MAT instruction is reached.

9. The method of claim 7 further comprising the step of delaying the off-line processor when a COUNT EQUAL signal is present.

10. The method of claim 7 further comprising the step of delaying the on-line processor if, upon completion of an interrupt cycle, a COUNT EQUAL signal is not present.

* * * * *